United States Patent
Stobart

(10) Patent No.: US 8,469,539 B2
(45) Date of Patent: Jun. 25, 2013

(54) SOLAR POWERED TABLE LIGHTING

(75) Inventor: Jonathan Stobart, Northmore (GB)

(73) Assignee: Smart Solar Ltd., Oxfordhire (GB)

( * ) Notice: Subject to any disclaimer, the term of this patent is extended or adjusted under 35 U.S.C. 154(b) by 0 days.

(21) Appl. No.: 13/416,537

(22) Filed: Mar. 9, 2012

(65) Prior Publication Data

US 2012/0227635 A1      Sep. 13, 2012

(30) Foreign Application Priority Data

Mar. 11, 2011   (GB) .................................. 1104145.6

(51) Int. Cl.
*A47B 25/00*    (2006.01)
*A47B 13/12*    (2006.01)
*F21L 13/00*    (2006.01)

(52) U.S. Cl.
USPC ............. 362/157; 362/183; 362/33; 362/127; 362/276

(58) Field of Classification Search
USPC .................... 362/33, 576, 127, 157, 183, 253, 362/276
See application file for complete search history.

(56) References Cited

U.S. PATENT DOCUMENTS

| | | | |
|---|---|---|---|
| 4,120,248 A * | 10/1978 | Broach | 108/23 |
| 5,638,758 A * | 6/1997 | Carr | 108/50.02 |
| 7,318,655 B2 * | 1/2008 | Sooferian | 362/153 |
| 7,611,417 B2 * | 11/2009 | Murrey et al. | 473/4 |
| 7,661,836 B1 | 2/2010 | Naranjo | |
| 7,794,103 B2 * | 9/2010 | Hoover | 362/153.1 |
| 2009/0207597 A1 * | 8/2009 | Silver | 362/183 |
| 2010/0091517 A1 * | 4/2010 | Brockman et al. | 362/555 |

FOREIGN PATENT DOCUMENTS

| | | |
|---|---|---|
| CN | 2872950 Y | 2/2007 |
| CN | 2872950 Y * | 2/2007 |
| CN | 201542043 U | 8/2010 |
| DE | 20118688 U1 | 11/2001 |
| DE | 102005010451 A1 | 9/2006 |
| EP | 2309179 A1 | 4/2011 |
| FR | 2749926 | 12/1997 |
| JP | 09092015 A | 4/1997 |
| JP | 10165232 A | 6/1998 |
| JP | 2003346520 A | 12/2003 |
| KR | 2020100010078 U | 2/2010 |
| KR | 1020100089043 U | 8/2010 |
| NL | 1026981 C | 3/2006 |
| WO | WO2006011821 A1 | 2/2006 |

OTHER PUBLICATIONS

GB 1104145.6 Examination Report under Section 18(3).
GB 1104145.6 Combined Search and Examination Report under Sections 17 and 18(3).

* cited by examiner

*Primary Examiner* — Peggy A. Neils
(74) *Attorney, Agent, or Firm* — Fay Sharpe LLP

(57) ABSTRACT

There is provided a self-contained solar module for a table comprising a transparent or translucent table top. The self-contained solar module comprises a solar panel for generating electrical energy; a power store for storing the generated electrical energy; and conductors for supplying the generated electrical energy to at least one lamp for lighting the transparent or translucent table top. The self-contained solar module may be removably attachable to the table, and/or the at least one lamp may be positioned on the self-contained solar module to be in a plane that is between the plane of the upper surface of the table top and the plane of the lower surface of the table top when the self-contained solar module is attached to the table.

12 Claims, 2 Drawing Sheets

SOLAR POWERED TABLE LIGHTING

Figure 1A:
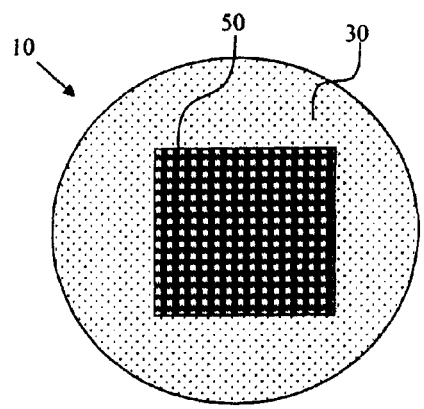

The present invention relates to solar powered table lighting, and in particular to a table comprising a solar panel and associated lamps for providing lighting effects.

A table incorporating a solar powered lamp is described in French patent application publication FR 2749926. The table has a glass plate table top with solar cells mounted beneath the glass. The solar cells are used to charge a battery which is supported beneath the table, and the energy of the battery may be used to operate lamps which are also mounted beneath the glass plate. A casing in which the battery and lamps are mounted may form the foot and stand for the table. A control switch may be mounted in the bottom of the assembly, and an automatic switch may be mounted near to the top of the unit.

However, faults in the electrical system may be complicated to diagnose and rectify, and the table needs to be designed with several fixings to support the various elements of the electrical system. Furthermore, the suitability of the table for outdoor use is uncertain given the various electrical components that may be affected by adverse weather conditions.

It is therefore an aim of the invention to improve upon known solar powered table lighting systems.

According to a first aspect of the invention, there is provided a solar table comprising a transparent or translucent table top and a self-contained solar module according to the appended claim 1.

The use of a self-contained solar module incorporating at least a solar panel, a power store, and conductors for supplying electrical energy to at least one lamp, collates the various electrical elements into a single self-contained module which may be easily replaced if a fault occurs.

The solar module is removably attachable to the table top, such that it can be easily interchanged between different tables, attached or removed according to whether solar powered lighting is desired, or according to weather conditions if tables are located outdoors. Furthermore, the solar module may be separated from the table to ease the replacement of the power store of the solar module if and when replacement is required.

The electrical circuits required to connect the solar panel, the power store, and the conductors together are within the capabilities of those skilled in the art, and as such will not be described further herein. The power store would typically be a rechargeable battery, although other forms of power storage such as a large capacitor could also be implemented.

Advantageously, the self-contained solar module may also incorporate the lamps to further improve the removability and interchangeability of the electrical system. The lamps are positioned on the self-contained solar module to be in a plane that is between the plane of the upper surface of the table top and the plane of the lower surface of the table top when the self-contained solar module is attached to the table. Then, light from the lamps may be transmitted longitudinally through the table top from the solar module to the edges of the table top, which may illuminate the edges of the table top and/or result in improved scattering of light from any patterns that may be formed in the table top. Preferably, the plane in which the lamps are positioned is substantially half way between the plane of the top surface of the table top and the plane of the bottom surface of the table top.

The lamps are outwardly directed towards the transparent or translucent table top to improve the transmission of light therethrough.

The at least one lamp may comprise at least four lamps positioned at regular intervals around the periphery of the solar module, the at least four lamps and the regular intervals providing a more uniform output of light from the solar module.

Advantageously, the solar module may further comprises a light sensor for sensing ambient light levels, and associated circuitry for turning on the at least one lamp when the ambient light level falls below a predetermined level. The light sensor may be positioned on the underside of the solar module to avoid covering by objects placed on the table/solar module.

The solar module may be attachable to the table by slotting the solar module into a hole through the surface of the table top. The solar module may for example rest against a base forming the bottom of the hole, or the solar module may comprise a flange for abutting against the surface of the table top thereby preventing the solar module from falling through the hole. Alternatively, the solar module may be held in place by a friction fit between the sides of the solar module and the sides of the hole, or corresponding clips on the solar module and on or around the hole could be used.

The hole may be formed directly above a leg of the table, such that the hole with the solar module installed does not interrupt the light passing through the table significantly more than what the leg would have done, thereby minimising the impact of the solar module upon the overall appearance of the table. Furthermore, the leg may form the base of the hole upon which the solar module can rest.

A further aspect of the invention provides a solar table system comprising the solar table of the first aspect of the invention and a removably attachable blank.

Advantageously, the removably attachable blank may be attached in place of the solar module when the solar module is removed. The blank may improve the appearance of the table when the solar module is not present, for example it may fill a hole left behind when the solar module is removed. The blank may also protect from the external environment any electrical connections between the solar module and the at least one lamp when the solar module is removed.

Figure 1B:
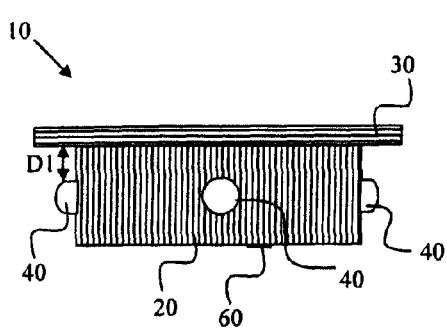
Figure 2A:
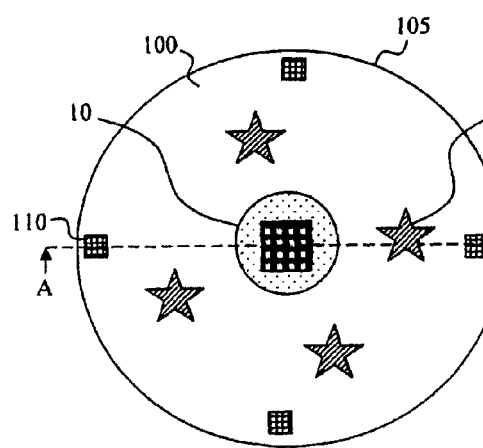
Figure 2B:
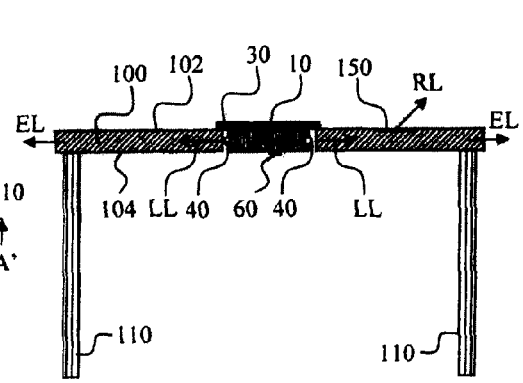
Figure 3A:
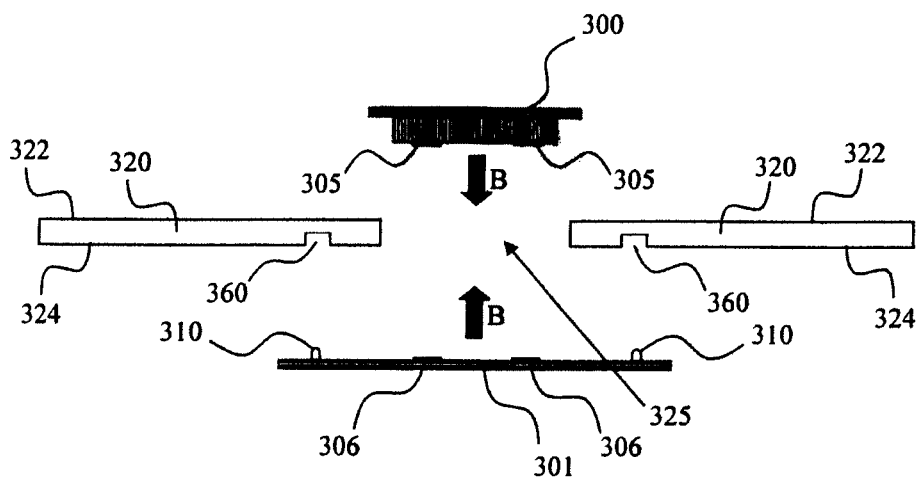
Figure 3B:
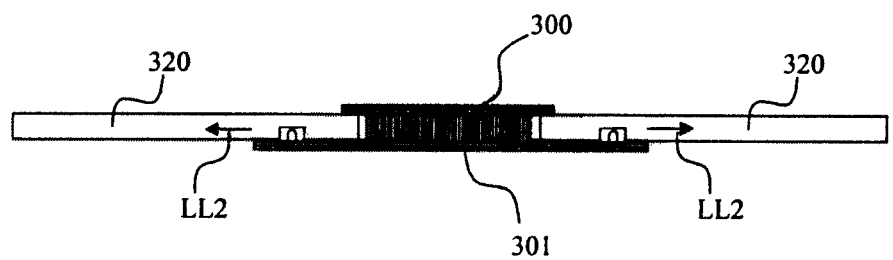
Figure 4:
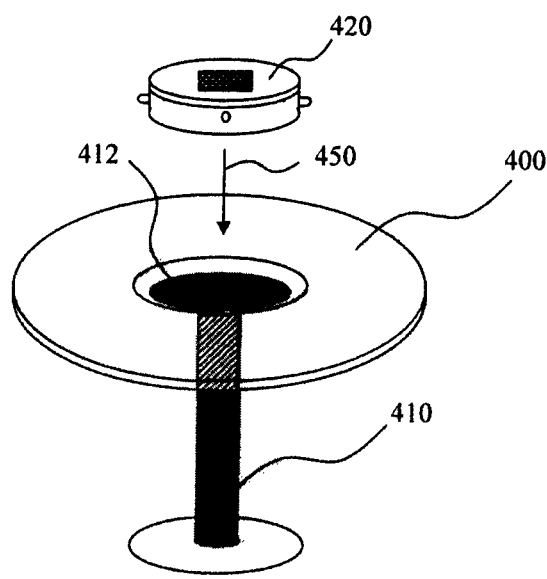

Embodiments of the invention will now be described with reference to the accompanying drawings, in which:

FIGS. 1*a* and 1*b* show schematic plan and sectional diagrams of a solar module according to a first embodiment of the invention;

FIGS. 2*a* and 2*b* show schematic plan and cross sectional diagrams of a solar table incorporating the solar module of FIGS. 1*a* and 1*b*;

FIGS. 3*a* and 3*b* shown schematic sectional diagrams of a solar module according to a second embodiment of the invention being fitted to a table; and FIG. 4 shows a schematic perspective diagram of a solar module according to a third embodiment of the invention being fitted to a table.

A first embodiment of the invention will now be described with reference to FIGS. 1*a* and 1*b*. FIG. 1*a* shows a plan schematic diagram of a self contained solar module 10 viewed from above in the same orientation as it would be viewed if fitted to a table. A solar panel 50 is fixed to the top of the solar module 10 for collecting electrical energy from ambient light, and the electrical energy is stored within a power store (not shown) within the solar module. As better seen in the sectional diagram of FIG. 1*b*, the solar module 10 comprises a flange 30 which is attached to a body portion 20 of the solar module. The body portion has four lamps 40 fixed to the body portion and outwardly-directed away from the solar module 10 for lighting the areas outside of the solar module. The lamps 40 are spaced at regular intervals around the periphery of the solar module 10, and are connected to conductors (not shown) for supplying power from the power store to the lamps 40.

The solar module 10 further comprises a light sensor 60 for sensing ambient light levels, and associated circuitry (not shown) for sending power from the power store to light the lamps 40 via the conductors when the ambient light falls below a predetermined level. The actual circuitry required to implement such a control function will be apparent to those skilled in the art, for example the light sensor 60 may have a variable resistance in response to the amount of light falling upon it.

In use, the solar module 10 generates electrical energy from ambient light and stores the generated electrical energy in a rechargeable battery. When the light levels falls below the predetermined level, the light sensor and associated circuitry cause electrical power to be sent from the rechargeable battery to the lamps 40 to produce light.

The fitting of the solar module 10 into a table will now be described with reference to FIGS. 2a and 2b. FIG. 2a shows a plan schematic diagram of a table incorporating the solar module 10 viewed from above, and FIG. 2b shows a cross-sectional diagram taken along A-A' as marked on FIG. 2a. The table includes a transparent table top 100 supported by table legs 110. The transparent table top has a hole that is larger than the body portion 20 of the solar module but smaller than the flange 30 of the solar module, such that the solar module 10 can rest in the hole and be supported by the flange 30 abutting the top surface 102 of the table as shown in FIG. 2b.

The lamps 40 are situated beneath the flange 30 by a distance D1 (see FIG. 1b) that is less than the thickness of the table top 100, such that the lamps 40 are between the plane of the upper surface 102 of the table top 100 and the plane of the lower surface 104 of the table top 100.

When the lamps 40 are lit, the lamps generate light LL. Due to the positioning of the lamps 40 next to the edges of the hole in the table top 100 and between the planes defined by the upper 102 and lower 104 surfaces of the table top, much of the light LL travels substantially horizontally through the transparent table by total internal reflection at the interfaces between the transparent table top and the surrounding air. Therefore, when the lamps 40 are lit the edge 105 at the periphery of the table top emits light EL, making the edge 105 appear brightly illuminated.

The table top further comprises star patterns 150 which are engraved into the transparent table top, and which disrupt the total internal reflection of the light LL horizontally through the table top. This results in the light RL being scattered and emitted from the table top at the locations of the star 150, giving the table brightly illuminated star shapes. Other shapes besides star shapes could alternatively be used, and patterning methods other than engraving could also be used. For example, various shapes could be patterned into the table top using frosting, etching, engraving, printing, or any other method of disrupting the light LL passing through the table top such that the light it is scattered or emitted from the table top at the desired locations.

In this embodiment, the transparent table top is made of glass, although other transparent materials such as transparent plastics could also be used. Furthermore, the table top may be translucent instead of transparent, and dissipate much of the light LL within the translucent material to create a glowing appearance before it reaches the edge 105 of the table top. In this embodiment, the entire table top is translucent/transparent, although table tops having one or more translucent/transparent portions and one or more translucent/transparent opaque portions may also be used for decorative effect.

In this particular embodiment, the lamps 40 are all within a plane that is approximately half way between the plane of the upper surface 102 of the table top and the plane of the lower surface 104 of the table top. Alternatively, the lamps may be arranged in a plurality of different planes, the plurality of different planes all being between the plane of the upper surface 102 of the table top and the plane of the lower surface 104 of the table top.

A blank (not shown in Figs) may be provided that is substantially the same size and shape as the solar module 10, and which can be inserted into the hole of the table 100 instead of the solar module 10.

A second embodiment of the invention will now be described with reference to FIGS. 3a and 3b, which show sectional diagrams of a self-contained solar module 300, 301 being fitted within a hole 325 of a transparent table top 320.

The self contained solar module comprises an upper body portion 300 with a flange for abutting to an upper surface 322 of the table top 320, and a lower body portion 301 for abutting to a lower surface 324 of the table top 320. The upper body portion 300 is sized to fit into the hole 325 and to join to the lower body portion 301. FIG. 3a shows a diagram of the self contained solar module prior to fitting to the table top 320, and FIG. 3b shows a diagram of the self contained solar module after fitting to the table top 320. The solar module is fitted to the table top by moving the upper 300 and lower 301 body portions of the solar module together in the directions B shown in FIG. 3a.

The upper body portion 300 has conductors 305 for supplying electrical energy to lamps 310 on the lower body portion 301. The lower body portion 301 has conductors 306 for connecting to the conductors 305, and for sending the electrical power to the lamps 310 along wires (not shown) within the body portion 301.

When the upper and lower body portions 300 and 301 are joined together through the hole 325, the conductors 305 and 306 contact one another and electrically connect the conductors 305 of the upper body portion to the lamps 310. The upper and lower body portions may be held together using temporary attachment means such as for example clips or screws. The temporary attachment means enables the solar module to be removed from the table top when desired.

During the fitting of the solar module to the table top 320, the lamps 310 on the lower body portion 301 locate into recesses 360 at the underside of the transparent table top 320, such that the lamps 310 are located between the planes of the upper 322 and lower 324 surfaces of the table top 320. Then, light LL2 from the lamps 310 can travel substantially horizontally through the table top 320 by total internal reflection.

In this embodiment the transparent table top is made from glass, although could also be made from other transparent or translucent materials as previously discussed in relation to the first embodiment.

A blank (not shown in Figs) may be provided that is substantially the same size and shape as the upper body portion 300, and the blank can be inserted into the hole instead of the upper body portion to cover the contacts 306. Alternatively, the lower body portion 301 may also be removed leaving only the blank and the table. A blank that is the same size and shape as the lower body portion 310 may also be provided to cover the recesses 360 when the solar module is not fitted to the table. The blank may be supplied as part of a solar table system also comprising the solar module and the table.

A third embodiment of the invention will now be described with reference to FIG. 4, which shows a schematic perspective diagram of a solar module 420 being fitted to a transparent/translucent table top 400. The table top 400 is supported by a table leg 410 at the centre of the table, and the table top 400 has a hole at the centre of the table. A portion of the table leg 412 forms a base at the bottom of the hole, upon which the solar module 420 can rest when the solar module is inserted into the hole in the direction 450.

The solar module is sized to fit into the hole of the table top such that the upper surface of the solar module 420 is flush with the upper surface of the table top 400 when the solar module 420 is resting upon the base 412 formed by a portion of the table leg.

The solar module comprises lamps that are positioned on the solar module 420 to be in plane(s) that are in between the planes of the upper surface of the table top and the lower surface of the table top, such that lamp light travels horizontally through the table top when the lamps are lit.

In use, light from the lamps spreads out horizontally from the lamps to the outer edges at the periphery of the table top. Since the table top is circular and the solar module is at the centre, the distance from the lamps to the peripheral edge of the table top is substantially the same for all locations around the peripheral edge, and so the peripheral edge lights up at a substantially uniform brightness.

The number of lamps and the positioning of the lamps that are applied to the solar module depends on the light intensities that are required at the various different portions of the table top. In the third embodiment shown in FIG. 4 where a substantially uniform brightness peripheral table top edge is desired, it is advantageous to have at least four lamps regularly spaced around the solar module, and the more regularly-spaced lamps that are used the more uniform the brightness of the peripheral table top edge is likely to be.

Alternatively, the solar module 420 may comprise a transparent layer orientated horizontally through the solar module in a plane that is co-planar with the plane of the upper surface of the table top, and a single lamp may be placed within the centre of the transparent layer. Then, light from the single lamp can radiate out evenly from the transparent layer of the solar module into the table top, such that the peripheral table top edge will light up at a uniform brightness.

In the described embodiments, the lamps are LED's due to their low power requirements, although alternate types of lamp may also be used.

The lamps may have various different colours for decorative effect, or all be of the same colour to provide an elegant uniformity.

In the described embodiments, the holes for receiving the solar modules are substantially circular, although other hole shapes could also be used. Furthermore, instead of using holes the solar module could be alternatively be fixed by clips/screws/adhesive to the upper or lower surface of the table top.

Recesses may be provided within the upper or lower surface of the table top for receiving the lamps of the solar module, for example recesses similar to the recesses 360 shown in FIG. 3*a*.

Further alternate embodiments falling within the scope of the appended claims will also be apparent to the skilled person.

The invention claimed is:

1. A solar table comprising a transparent or translucent table top and a self-contained solar module, the self-contained solar module comprising:
   a solar panel for generating electrical energy;
   a power store for storing the generated electrical energy; and
   conductors for supplying the generated electrical energy to at least one lamp for lighting the transparent or translucent table top; and
   the at least one lamp, and
   wherein the self-contained solar module is removably attachable to the table top such that the at least one lamp is:
   outwardly directed towards the transparent or translucent table top;
   positioned on the self-contained solar module to be in a plane that is between the plane of the upper surface of the table top and the plane of the lower surface of the table top so light from the at least one lamp travels through transparent or translucent material of the table top by total internal reflection.

2. The solar table of claim 1, wherein the at least one lamp comprises at least four lamps, wherein the at least four lamps are spaced at regular intervals around the periphery of the solar module.

3. The solar table of claim 1, wherein the self-contained solar module further comprises a light sensor for sensing ambient light levels, and associated circuitry for turning on the at least one lamp when the ambient light level falls below a predetermined level.

4. The solar table of claim 1, wherein the self-contained solar module is attachable by slotting into a hole in the surface of the table top so that the self-contained solar module rests within the hole.

5. The solar table of claim 4, wherein the self-contained solar module comprises a flange for abutting the surface of the table top when the self-contained solar module is slotted into the hole.

6. A solar table according to claim 4, wherein the table top is circular and the hole in the surface of the table top is at the centre of the table top.

7. A solar table according to claim 4, wherein the hole in the surface of the table top is formed directly above a leg of the table, and wherein the self-contained solar module is attachable to the table top by slotting into the hole.

8. A solar table according to claim 7, wherein the hole has a base which is formed by a leg of the table.

9. The solar table of claim 1, wherein the entire table top is transparent or translucent.

10. The solar table of claim 1, wherein the table top is patterned to scatter light from the at least one lamp.

11. The solar table of claim 10, wherein the patterning comprises frosting, etching, engraving, or printing.

12. A solar table system, comprising the solar table of claim 1, and further comprising a removably attachable blank for attaching in place of the self-contained solar module when the solar module is removed.

* * * * *